(12) United States Patent
Barbosa et al.

(10) Patent No.: US 6,651,784 B1
(45) Date of Patent: Nov. 25, 2003

(54) AUTOMATICALLY-ADJUSTING, HAND-BRAKE ACTUATOR AND HOUSING OF LIGHT WEIGHT MATERIAL

(75) Inventors: Manuel Barbosa, Novi, MI (US); Seiya Odaka, West Bloomfield, MI (US); Takashi Matsumoto, Commerce Township, MI (US)

(73) Assignee: Akebono Corporation North America, Farmington Hills, MI (US)

( * ) Notice: Subject to any disclaimer, the term of this patent is extended or adjusted under 35 U.S.C. 154(b) by 0 days.

(21) Appl. No.: 09/831,043

(22) PCT Filed: Sep. 7, 2000

(86) PCT No.: PCT/US00/20817

§ 371 (c)(1),
(2), (4) Date: May 4, 2001

(87) PCT Pub. No.: WO00/18423

PCT Pub. Date: Mar. 15, 2001

Related U.S. Application Data

(60) Provisional application No. 60/152,355, filed on Sep. 7, 1999.

(51) Int. Cl.⁷ .............................................. F16D 65/56
(52) U.S. Cl. ..................................................... 188/71.9
(58) Field of Search ................................ 188/71.9, 72.6, 188/72.8, 72.9, 106 F

(56) References Cited

U.S. PATENT DOCUMENTS

| | | | |
|---|---|---|---|
| 3,878,923 A | * | 4/1975 | Farr ........................ 188/196 D |
| 3,900,084 A | * | 8/1975 | Farr ......................... 188/196 F |
| 4,159,754 A | | 7/1979 | Airheart et al. |
| 4,615,417 A | | 10/1986 | Schneider et al. |
| 4,633,978 A | * | 1/1987 | Hoff ........................... 188/71.7 |
| 4,719,997 A | | 1/1988 | Tsuruta |
| 5,000,294 A | | 3/1991 | Hunnicutt et al. |
| 5,060,765 A | | 10/1991 | Meyer |
| 5,263,554 A | | 11/1993 | Mery |
| 5,487,452 A | | 1/1996 | Moinard et al. |
| 5,609,227 A | | 3/1997 | Mery |
| 5,788,024 A | | 8/1998 | Meyer |
| 5,868,225 A | | 2/1999 | Hulliger |

* cited by examiner

*Primary Examiner*—Christopher P. Schwartz
(74) *Attorney, Agent, or Firm*—Clark & Brody

(57) ABSTRACT

An apparatus for operating a hand brake is disclosed. The apparatus comprises a housing (2) and an adjustable actuator (4, 6), wherein the housing (2) has a cavity which contains a ball ramp plate (48, 50) and a sleeve nut (6) to prevent their rotation.

9 Claims, 6 Drawing Sheets

AUTOMATICALLY-ADJUSTING, HAND-BRAKE ACTUATOR AND HOUSING OF LIGHT WEIGHT MATERIAL

This application claims the benefit of provisional application Ser. No. 60/152,355 filed Sep. 7, 1999.

TECHNICAL FIELD

This invention relates to the art of automatic adjusters for the hand brake of an automobile disc brake system.

BACKGROUND ART

Mechanical adjusters are typically used for eliminating slack in a mechanical actuator used for the hand brake of a disc brake system resulting from wear of the disc pad's friction material. Known actuators include a spindle fitted to a sleeve nut by a coarse screw thread, whereby one of the spindle or sleeve nut rotates with respect to the other in response to a very low axial force, thereby to adjust the overall length of the actuator.

During assembly, these mechanisms must be assembled into a cavity formed in the brake housing, and the ease of assembly is an important characteristic of any adjuster design.

Further, the adjusting mechanism must be capable of operating with materials of reduced weight, such as a housing made of aluminum. Thus, actuators designed to operate with a housing of materials such as cast iron are not always suitable for use with aluminum housings. One reason is the differences between the casting properties of the different materials, and another is the different wear properties.

For example, the initial shape of a cavity in a housing made of cast iron can be made closer to the desired shape than those formed in an aluminum housing, because a cavity in a cast-iron housing is made by sand casting, whereas a cavity in an aluminum housing is made with a permanent mold, usually made of steel. Sand casing allows more complex shapes than permanent molds and facilitates formation of cavities of greater depth, with the result that the aluminum housing often requires substantially more machining than an iron housing.

Thus, designs for housings made of aluminum have not been able to adopt prior designs outright. One example of a prior adjusting actuator mechanism is that shown in U.S. Pat. No. 5,060,765. This patent shows an actuator of the type having two cam plates that rotate with respect to each other about a longitudinal axis of the actuator. The actuator includes an adjuster that is constructed in two parts for ease of assembly in the housing. The first part of the adjuster is an insert assembly comprising an actuation shaft, which is integral with one of the cam plates, a stationary cam plate, a threaded strut member, a return spring, and a steel insert. The return spring is placed between the front face of the steel insert and the adjustable cam plate, and one end of the insert is attached to the fixed cam plate, thus securing the parts of the insert assembly together.

The threaded strut member is held against rotation by engagement between a radial projection of the strut and a groove in the steel insert. Thus, the housing may be made of a relatively soft material because the steel material of the insert has good wear properties and can withstand the wear caused by the reciprocating motion of the threaded strut. A disadvantage, however, is that reliance on engagement with the insert to prevent rotation of the threaded strut requires assembly as an insert, which complicates manufacture of the part.

SUMMARY OF THE INVENTION

In accordance with the invention, a housing made of a light-weight material, such as aluminum, is provided with a cavity that is deep enough to accommodate both of the cam plates and is configured to engage one of the cam plates and a peripheral part of the sleeve to prevent rotation of these elements.

In one arrangement, the housing is configured such that the sleeve nut and the one cam plate are engaged in the same fashion. In one embodiment of this arrangement, the cavity is generally cylindrical but has two or more elongate, axially extending parallel grooves that receive radial, outwardly extending fingers on the sleeve nut and cam plate. The engagement between the groove and the fingers prevents rotation of these elements. In a second embodiment of this arrangement, the cylindrical cavity is provided with at least two, tube-like, radial projections that extend inward to engage grooves in the periphery of the cam plate and sleeve nut.

In another arrangement, the one cam plate engages the housing differently from the engagement between the housing and the sleeve nut. In one such embodiment, the cam plate is provided with an axial projection that engages a hole in the housing while the sleeve nut is provided with radial fingers that engage an axial groove in the housing.

In a further embodiment, the housing is provided with a wear ring made of a material having a hardness greater than that of the housing material to increase wear resistance.

DETAILED DESCRIPTION OF THE PREFERRED EMBODIMENTS

Figure 1:
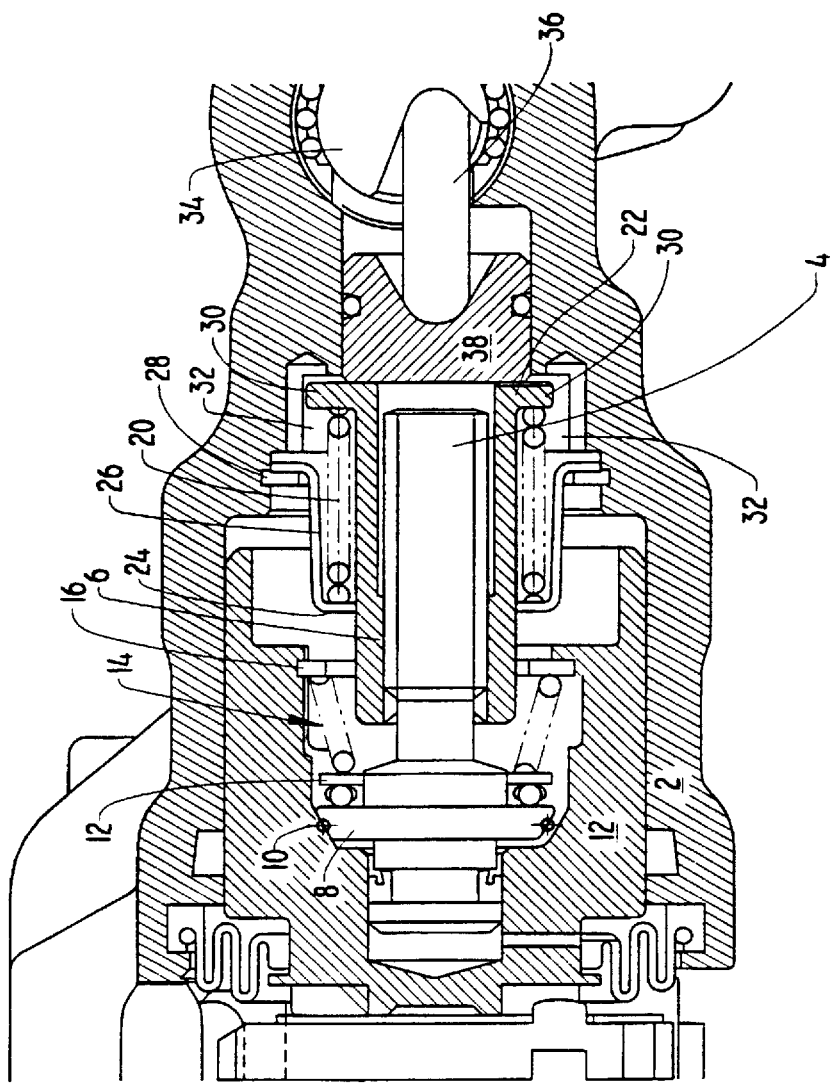
FIG. 1 is a longitudinal cross section of a known brake housing and adjustable actuator.

With reference to FIG. 1, a known adjustable actuator is shown in place in a housing 2. The adjustable actuator includes a threaded spindle 4 and a sleeve nut 6. The front of the spindle 4 includes a conical surface 8 for engaging a mating surface 10 on the piston 12. The sleeve nut and the spindle are urged apart by adjustment spring 14, which extends between a locking ring 16 and a thrust washer 18. An over-adjust spring 20 is retained in compression between the flange end 22 of the sleeve nut and the front end 24 of a cage 26. The cage is held in the housing by a snap ring 28 which fits in an annular groove in the housing. The sleeve nut is prevented from rotation by engagement between fingers 30 on the sleeve nut flange 22 and longitudinal grooves 32 in the housing 2.

The adjustable actuator of the assembly shown in FIG. 1 is urged outward by rotation of a cam 34 about an axis transverse to the longitudinal axis of the adjuster. A rod 36 engages the cam at one end and a piston 38 at the other, the piston 38 being in contact with the flange of the sleeve nut. Upon rotation of the cam 34 by the hand brake cable, the piston 38 is urged toward the left, which urges the activator toward the left. The conical face of the actuator engages the piston 12, which, in turn, applies force to the brake pad to grip the rotor.

The housing of the assembly shown in FIG. 1 is made of cast iron, and the cavities receiving the various parts are made by sand casting techniques. This assembly, however, is difficult to assemble because of the necessity of assembling the cam 34, rod 36 and the piston 38.

Figure 2:
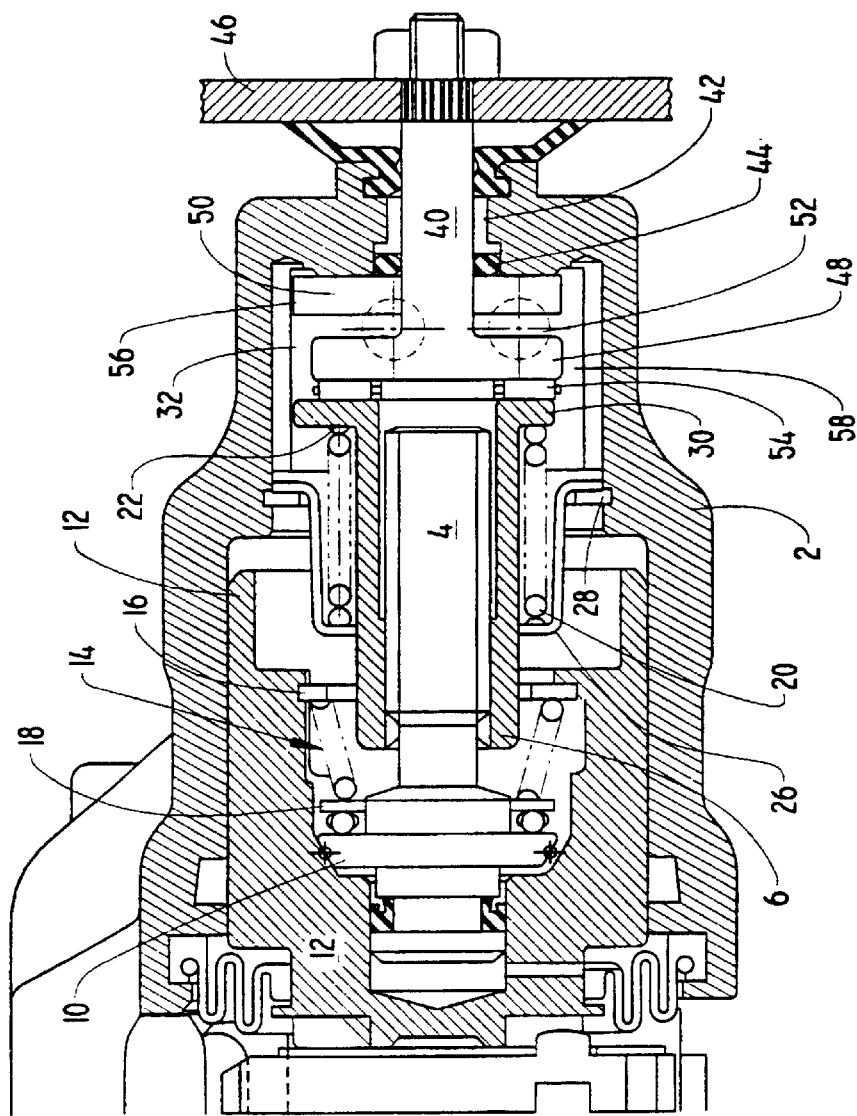
FIG. 2 is a longitudinal cross section of a brake housing and adjustable actuator in accordance with the invention.

FIG. 2 illustrates a first embodiment of a lightweight, easily-assembled disc brake mechanism with hand brake actuator in accordance with the invention. The housing in this embodiment is preferably of aluminum to reduce weight of the housing.

The embodiment of FIG. 2 employs an axial shaft 40 carried in an opening in the end of the housing 2, the opening having a bushing 42 therein. A seal 44 ensures against leakage of brake fluid. One end of the shaft 40 has a lever 46 for connection to an actuating cable (not shown) and a cam plate, or ball ramp, is at the other end. A stationary ball ramp plate 50 is placed between the ball ramp plate 48 and the end of the housing 2, and balls 52 are held between the two ball ramps. Rotation of the shaft 40 by operation of the lever 46 rotates the ball ramp plate 48 with respect to the ball ramp plate 50 to advance the ball ramp plate 48 toward the left of FIG. 2.

A thrust bearing 54 is held between the flange 22 and the ball ramp plate 48 whereby movement of the ball ramp plate toward the left upon rotation of the shaft 40 urges the sleeve nut toward the left, which urges the spindle 4 toward the left and causes engagement between the brake pad and the rotor. As the brake pad wears, the rest position of the piston 12 will move to the left to create a gap between the piston 12 and the conical surface of the end of the spindle, and the spindle will rotate with respect to the sleeve nut, because of the force applied by the spring 14, to elongate the actuator. The over-adjust spring 20 will hold the sleeve nut against the ball ramp 48 to allow the spindle to rotate with respect to the sleeve nut, unless the force applied to the piston 12 is larger than that applied by the over-adjust spring.

High pressures are applied during hard braking and these tend to distort the caliper. At high pressure the spindle seal holds the spindle cone seat against the piston, thus preventing rotation. The over-adjust spring prevents adjustment in this situation by allowing the sleeve nut to follow the spindle axially such that no rotation of the spindle results.

The sleeve nut is held against rotation by engagement between fingers 30 on the sleeve nut and an axial groove 32, much as in the arrangement of FIG. 1. Moreover, the stationary ball ramp plate 50 is also held against rotation by engagement of fingers 56 in the groove 32.

It will be appreciated that the arrangement of FIG. 2 provides several advantages over the prior arrangement shown in FIG. 1. First, the arrangement of FIG. 2 provides a shaft 40 aligned with a longitudinal axis of the housing to simplify its assembly. More important, however, is the arrangement of both the stationary ball ramp and the non-rotating sleeve nut in the cavity 58 and provision of means, such as the groove 32, in the housing adjacent this cavity for restraining the sleeve nut and the stationary plate against rotation. This structure greatly simplifies assembly because the parts may be assembled without the necessity of making a sub-assembly. Thus, the structure shown in FIG. 2 can be assembled by sequentially placing in the housing, the stationary plate 50, the balls 52, the shaft 40, the thrust bearing 54, and the sleeve nut. Then, the over-adjust spring, cage 26, locking ring 28, spindle etc. are installed.

Figure 2A:
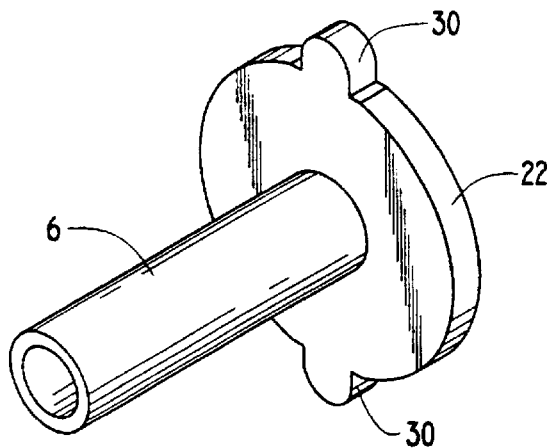
FIG. 2a is a perspective of a sleeve nut used in the embodiment of FIG. 2.
Figure 2B:
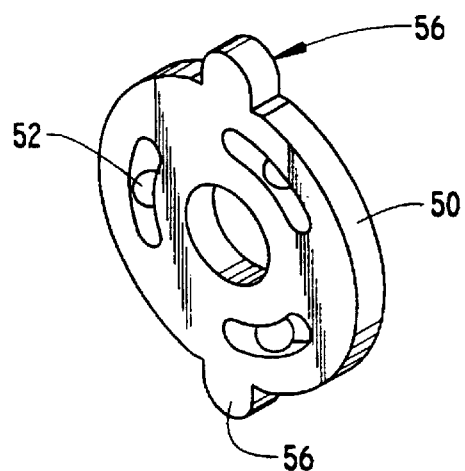
FIG. 2b is a perspective of a stationary ball ramp used in the embodiment of FIG. 2.
Figure 2C:
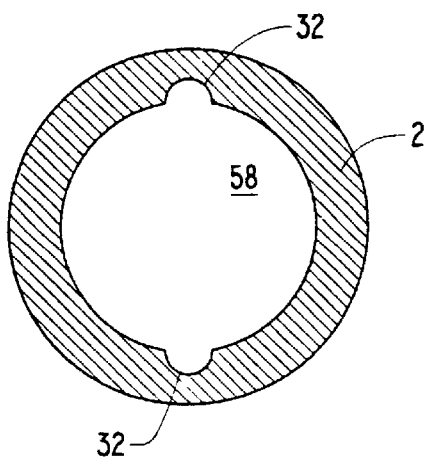
FIG. 2c is a transverse cross section of the housing of the embodiment of FIG. 2.

FIG. 2a illustrates a preferred form of the sleeve nut 6 and the preferred cross sectional shape of the housing 2 to receive the sleeve nut in such a manner that longitudinal motion is allowed and yet to prevent rotation.

Figure 3:
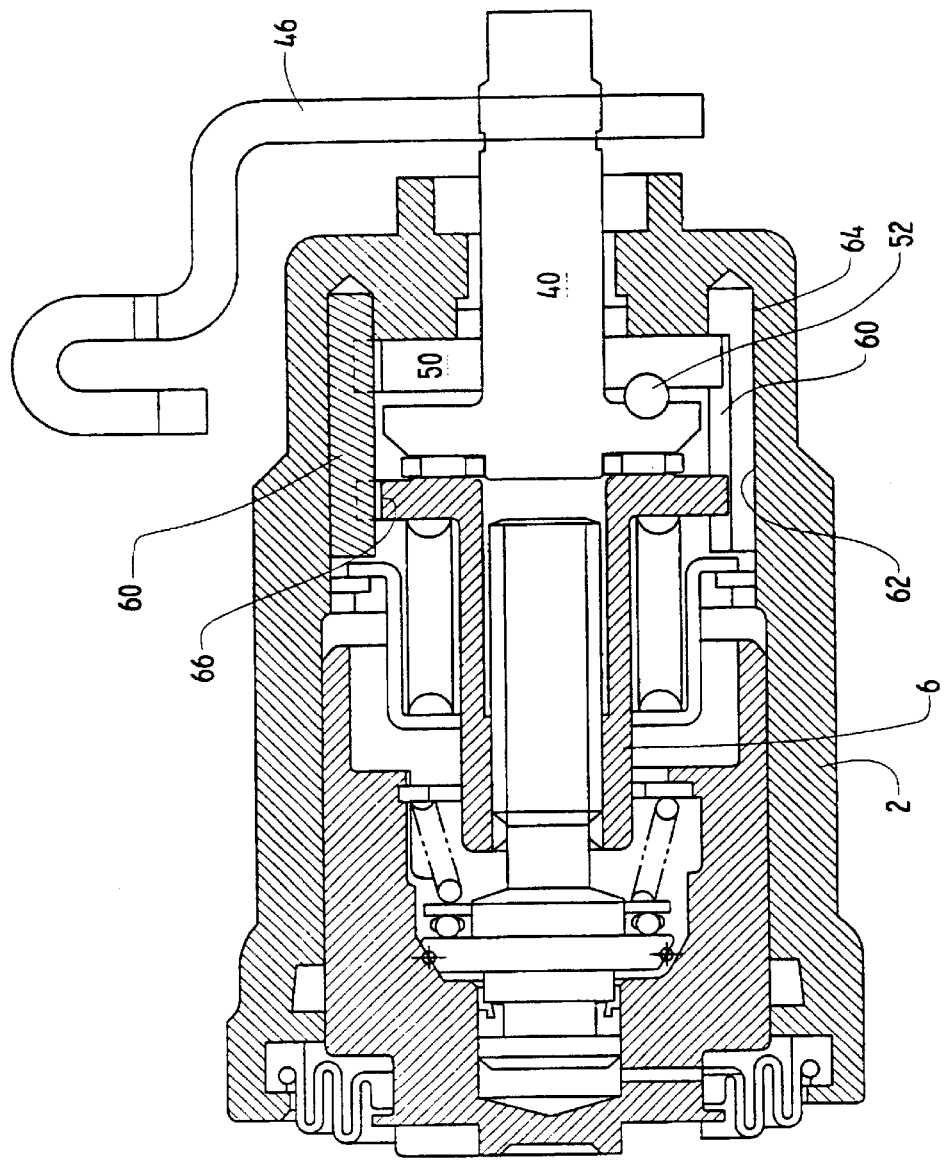
FIG. 3 is a longitudinal cross section of a brake housing and adjustable actuator in accordance with a second embodiment of the invention

FIG. 3 shows a modification of the embodiment of FIG. 3 that is particularly useful when high usage is expected for an assembly made of softer materials. In this embodiment, the housing 2 is made of a material such as aluminum, to reduce weight, and the sleeve nut is made of a harder material such as iron. Thus, the material of the housing may be subjected to excessive wear.

Figure 3A:
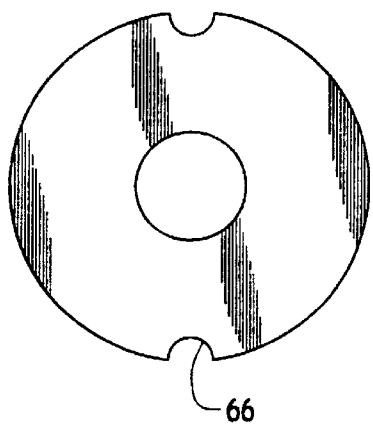
FIG. 3a is a perspective of a sleeve nut used in the embodiment of FIG. 3.
Figure 3B:
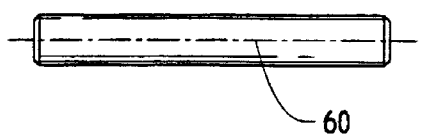
FIG. 3b is a side view of a pin used in the embodiment of FIG. 3.

In accordance with the embodiment of FIG. 3, the housing 2 is provided with pins 60 that can be made of harder materials, such as iron, for reducing wear. The pins are shown diametrically opposed, but they can be located at other peripheral locations. Each pin 60, shown also in FIG. 3b, fits in a respective longitudinal groove 62, shown also in FIG. 3a, along most of its length, and one end is held in a hole 64 in the housing. The sleeve nut and stationary ball ramp are provided with notches 66 that cooperate with the cylindrical shape of the pins to allow longitudinal motion of the sleeve nut while restricting rotation.

Figure 4A:
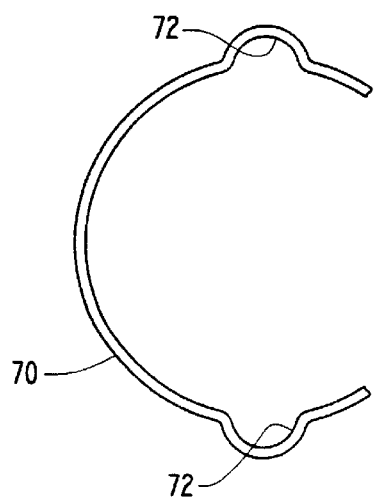
FIG. 4a is a front view of a wear ring used in the embodiment of FIG. 4.
Figure 4:
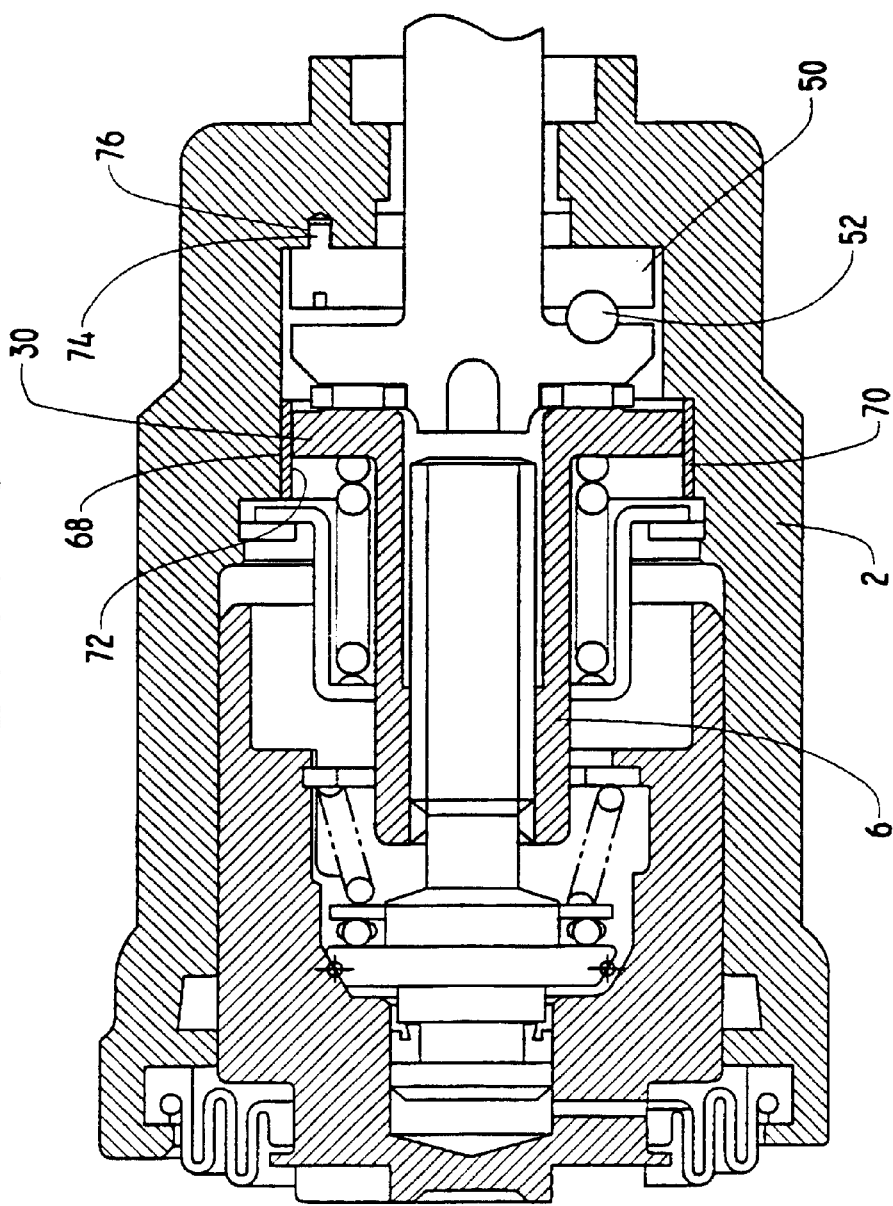
FIG. 4 is a longitudinal cross section of a third embodiment if the invention.

FIG. 4 illustrates yet another embodiment wherein the housing 2 is provided with a groove 68, but a wear ring 70, which fits the configuration of the housing, including that of the groove, is also provided. The interior of the wear ring, thus, provides a longitudinal groove 72. The sleeve nut has the configuration shown in FIG. 2a, whereby fingers on the sleeve nut engage the groove 72. In this case, the wear ring is made of a hardened material to reduce wear.

Also in FIG. 4, the stationary ball ramp plate 50 is restrained from rotation by engagement between a pin 74 and the housing, which is provided by a hole 76 that receives the pin.

FIG. 4a is a front view of the wear ring. It will be appreciated that the wear ring in the embodiment illustrated does not extend completely around the interior of the housing. It is only necessary that the ring include the groove portions 72, and the "C" shape shown is preferred. Of course, other shapes, including peripherally closed shape are contemplated.

As noted, the housing of the invention is preferably made of a light-weight material, such as aluminum. Because of the inferior wear properties of aluminum, such a construction poses the problem of a restricted lifetime for the assembly. Thus, the embodiments of FIGS. 3 and 4 are preferred because they provide wear elements, i.e., a protruding element, such as a pin or a recessed element, such as a ring, that can be made of hardened materials.

Another problem with the construction suggested by the invention is that lightweight materials such as aluminum are more difficult to mold. For this reason the cavity receiving the stationary ball ramp is generally kept shallow and uncomplicated, when using a permanent mold to reduce production costs. Applicant has found however, that the advantages afforded by the relative ease of construction outweigh any additional steps required for manufacture.

Further, an aluminum housing for the invention can be expeditiously manufactured in the following manner. First, a reusable core is used to provide an initial cavity as is known in the art. The cavity provided by such a core is not of the exact shape ultimately desired. It is, therefore, necessary to remove a substantial amount of material by machining to form the cavity, and the longitudinal grooves must be provided. Thus, the housing is machined, after the initial molding, by first drilling two holes at the locations of the grooves 32, 62, or 68, depending on the embodiment being manufactured. The diameters of these holes are those of the grooves. Because there is excess material remaining in the area of the cavity as a result of the casting process, this drilling is facilitated and results in a housing with two peripherally-spaced holes therein. Then, the remainder of the cavity is bored out, leaving a cavity of the desired shape with the grooves adjacent. Thus, the cavity and grooves can be made in only two steps.

It will be appreciated that a unique assembly for a hand brake assembly for a disc brake has been described. Modifications within the scope of the appended claims will be apparent to those of skill in the art.

I claim:

1. Apparatus for operating a hand brake comprising a housing and an adjustable actuator, wherein said housing comprises a cavity and means adjacent said cavity for preventing rotation and said actuator comprises a stationary ball ramp plate, a spindle, and a sleeve nut, said stationary ball ramp plate and one of said spindle and said sleeve nut having means for engaging said means for preventing rotation.

2. Apparatus according to claim 1 wherein said housing provides one or more parallel, longitudinal grooves in said cavity that engage projections on said spindle or sleeve nut and said one of said ball ramp plates.

3. Apparatus for operating a hand brake comprising a housing and an adjustable actuator, wherein said adjustable actuator comprises a spindle and sleeve nut and a pair of ball ramp plates wherein said housing forms a cavity deep enough to receive said pair of ball ramp plates and one of said spindle and sleeve nut and said cavity is configured such that said one of said spindle and sleeve nut and one of said ball ramp plates engage said cavity for preventing rotation.

4. Apparatus according to claim 3 wherein said housing provides one or more parallel, longitudinal projections extending from said cavity that engage grooves on said spindle or sleeve nut and said one of said ball ramp plates.

5. Apparatus according to claim 4 wherein said one or more parallel, longitudinal projections are cylindrical elements of a material harder than said lightweight material.

6. Apparatus according to claim 5 wherein said cylindrical elements are received in spaced parallel holes in said housing.

7. Apparatus according to claim 3 further comprising a wear ring inserted in said housing and conforming to at least a portion of the interior shape of said cavity.

8. Apparatus according to claim 3 wherein said housing provides one or more parallel, longitudinal grooves in said cavity that engage projections on said spindle or sleeve nut and a pin engages said one of said ball ramp plates and said housing to maintain said one of said ball ramp plates stationary.

9. A method of making the apparatus of claim 3 comprising casting said housing to form said cavity in rough form, drilling at least one hole in said housing adjacent said cavity, and boring said cavity to its final shape.

* * * * *